(12) United States Patent
Gu et al.

(10) Patent No.: US 10,478,935 B2
(45) Date of Patent: Nov. 19, 2019

(54) DEBURRING APPARATUS

(71) Applicant: FANUC CORPORATION, Yamanashi (JP)

(72) Inventors: Yihua Gu, Yamanashi (JP); Takashi Satou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/831,971

(22) Filed: Dec. 5, 2017

(65) Prior Publication Data

US 2018/0161952 A1    Jun. 14, 2018

(30) Foreign Application Priority Data

Dec. 8, 2016   (JP) .................................. 2016-238432

(51) Int. Cl.
*B24B 27/00* (2006.01)
*B24B 49/12* (2006.01)
(Continued)

(52) U.S. Cl.
CPC ............ *B24B 27/0038* (2013.01); *B24B 9/00* (2013.01); *B24B 49/12* (2013.01); *B24B 49/16* (2013.01);
(Continued)

(58) Field of Classification Search
USPC ........................................................ 700/164
See application file for complete search history.

(56) References Cited

U.S. PATENT DOCUMENTS 8,275,479 B1 * 9/2012 Freeman ............ B23Q 17/2409
228/9
2011/0282492 A1    11/2011 Krause et al.
(Continued)

FOREIGN PATENT DOCUMENTS

CN          201205624 Y       3/2009
CN          102126028 A       7/2011
(Continued)

OTHER PUBLICATIONS

Office Action dated Jul. 3, 2018 in corresponding Japanese Application No. 2016-238432; 6 pages.
(Continued)

*Primary Examiner* — Mohammad Ali
*Assistant Examiner* — Joshua T Sanders
(74) *Attorney, Agent, or Firm* — Maier & Maier, PLLC

(57) ABSTRACT

A deburring apparatus including: a robot that uses a deburring tool to deburr an object supported by a support in a machine tool, a visual sensor, a relative movement mechanism for causing relative movement between the visual sensor and the object supported by the support; and a controller, wherein the controller is configured to conduct: an operation process that operates the relative movement mechanism based on a visual sensor relative movement program for controlling an operation of the relative movement mechanism so that a ridge of the object supported by the support is detected by the visual sensor during the relative movement; and a deburring operation program generation process which generates a deburring operation program by using the detected ridge obtained by the visual sensor when the relative movement mechanism is operated based on the visual sensor relative movement program.

8 Claims, 11 Drawing Sheets

(51) Int. Cl.
*B24B 49/16* (2006.01)
*B24B 9/00* (2006.01)
*B25J 11/00* (2006.01)
*B25J 9/16* (2006.01)

(52) U.S. Cl.
CPC ............ *B25J 9/1633* (2013.01); *B25J 9/1697* (2013.01); *B25J 11/006* (2013.01); *G05B 2219/37208* (2013.01); *G05B 2219/45151* (2013.01)

(56) References Cited

U.S. PATENT DOCUMENTS

| | | | |
|---|---|---|---|
| 2013/0203320 A1* | 8/2013 | Ghalambor | B24C 1/083 451/2 |
| 2013/0329954 A1 | 12/2013 | Ikeda et al. | |
| 2015/0005923 A1 | 1/2015 | Gu | |
| 2015/0268659 A1 | 9/2015 | Nishi | |
| 2016/0214143 A1 | 7/2016 | Nagatsuka | |
| 2016/0243664 A1 | 8/2016 | Nagata | |
| 2017/0076915 A1* | 3/2017 | Boyd, Jr. | H01J 37/32697 |
| 2017/0129066 A1 | 5/2017 | Okuda | |
| 2017/0133253 A1* | 5/2017 | Fischer | G01B 11/272 |

FOREIGN PATENT DOCUMENTS

| | | |
|---|---|---|
| CN | 102378943 A | 3/2012 |
| CN | 103313921 A | 9/2013 |
| CN | 103394763 A | 11/2013 |
| CN | 104249195 A | 12/2014 |
| CN | 204639337 U | 9/2015 |
| CN | 105855630 A | 8/2016 |
| CN | 106041948 A | 10/2016 |
| EP | 0479648 A1 | 4/1992 |
| EP | 2653414 A1 | 10/2013 |
| JP | H05-345260 A | 12/1993 |
| JP | H08-314515 A | 11/1996 |
| JP | 2006-289580 A | 10/2006 |
| JP | 2010-182210 A | 8/2010 |
| JP | 2015-009324 A | 1/2015 |
| JP | 2015-182173 A | 10/2015 |
| JP | 5845212 B2 | 1/2016 |
| JP | 2016-137551 A | 8/2016 |
| JP | 2016-150428 A | 8/2016 |
| JP | 2017-091269 A | 5/2017 |

OTHER PUBLICATIONS

Search Report dated Jun. 25, 2018 in corresponding Japanese Application No. 2016-238432; 22 pages.
Office Action dated Mar. 4, 2019 in corresponding Chinese Application No. 201711236030.2; 19 pages.
Japanese Decision to Grant a Patent dated Nov. 27, 2018, in connection with corresponding JP Application No. 2016-238432 (6 pgs., including English translation).

* cited by examiner

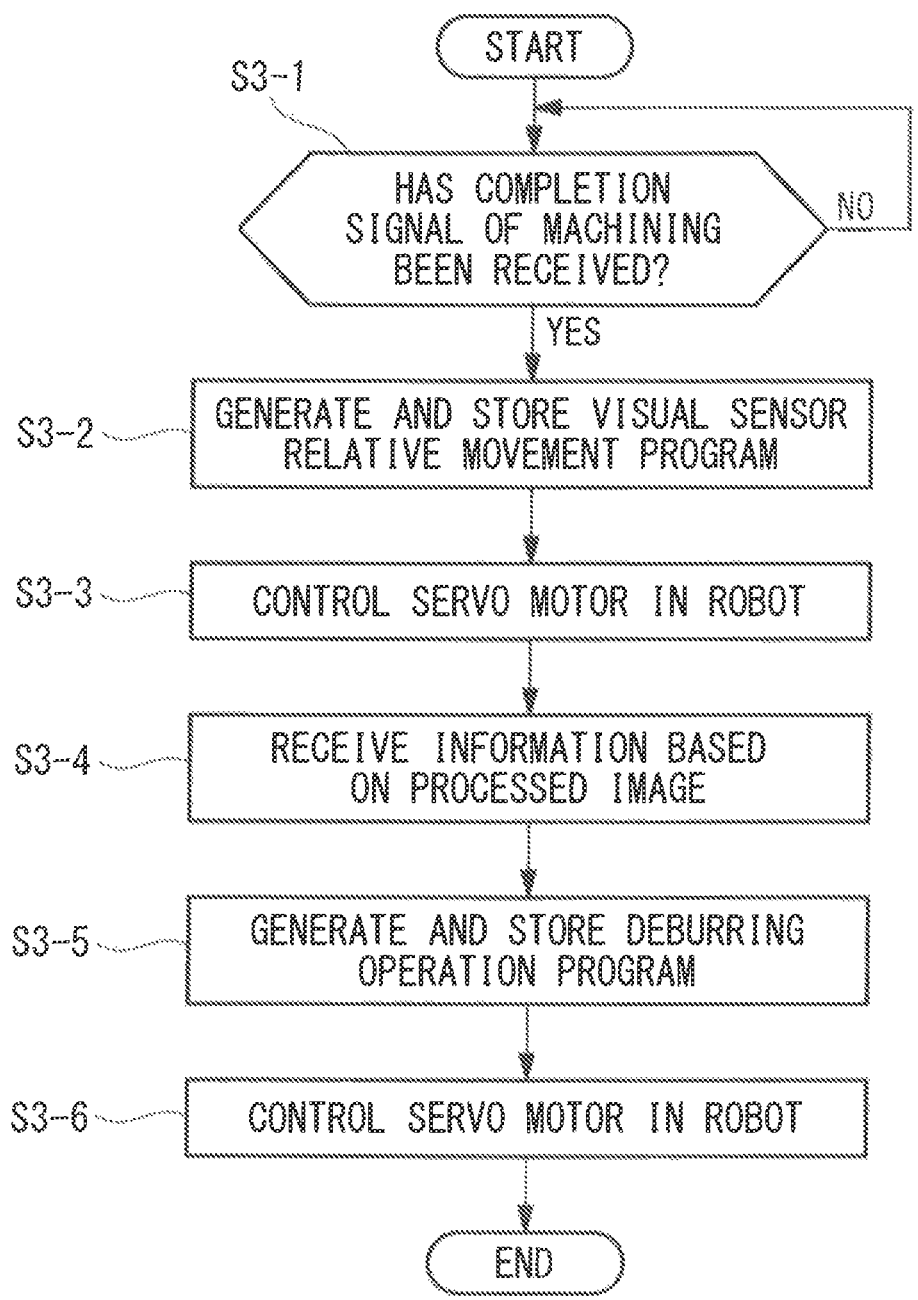

DEBURRING APPARATUS

CROSS-REFERENCE TO RELATED APPLICATIONS

This application is based on and claims priority to Japanese Patent Application No. 2016-238432 filed on Dec. 8, 2016, the entire content of which is incorporated herein by reference.

TECHNICAL FIELD

The present invention relates to a deburring apparatus which conducts a deburring process for a cut object.

BACKGROUND ART

A known deburring apparatus of this type includes a support that supports an object to be deburred (such as a workpiece) having been flattened and burred, and a deburring tool attached to a robot (for example, see PTL 1). The deburring apparatus includes an imaging device that places the object to be deburred within its visual field, and a ridge of an outer periphery of the object to be deburred in imaged data is regarded as a portion to be deburred by a controller. Also, in order to achieve deburring precision at a certain level or higher, the controller uses the ridge data and three-dimensional data of the object to be deburred such as CAD data to generate data regarding shapes and positions of burrs, and the data is used for deburring by the robot.

CITATION LIST

Patent Literature

{PTL 1} Publication of Japanese Patent No. 5845212

SUMMARY OF INVENTION

An aspect of the present invention provides a deburring apparatus including: a robot that supports a deburring tool, and uses the deburring tool to conduct a deburring process for an object supported by a support in a machine tool and having been cut; a visual sensor; a relative movement mechanism for causing relative movement between the visual sensor and the object supported by the support; and a controller, wherein the controller is configured to conduct: an operation process that operates the relative movement mechanism based on a visual sensor relative movement program for controlling operation of the relative movement mechanism so that a ridge of the object supported by the support is detected by the visual sensor during the relative movement; and a deburring operation program generation process which generates a deburring operation program by using the detected ridge obtained by the visual sensor when the relative movement mechanism is operated based on the visual sensor relative movement program, wherein the deburring operation program is a program which operates the robot and/or the machine tool so that the deburring tool moves along a locus based on the detected ridge.

BRIEF DESCRIPTION OF DRAWINGS

FIG. 13 is a flowchart of processing of a main controller in the robot control unit used in the deburring apparatus according to the second embodiment.

DESCRIPTION OF EMBODIMENTS

With reference to the drawings, a deburring apparatus according to a first embodiment of the present invention will be described below.

Figure 1:
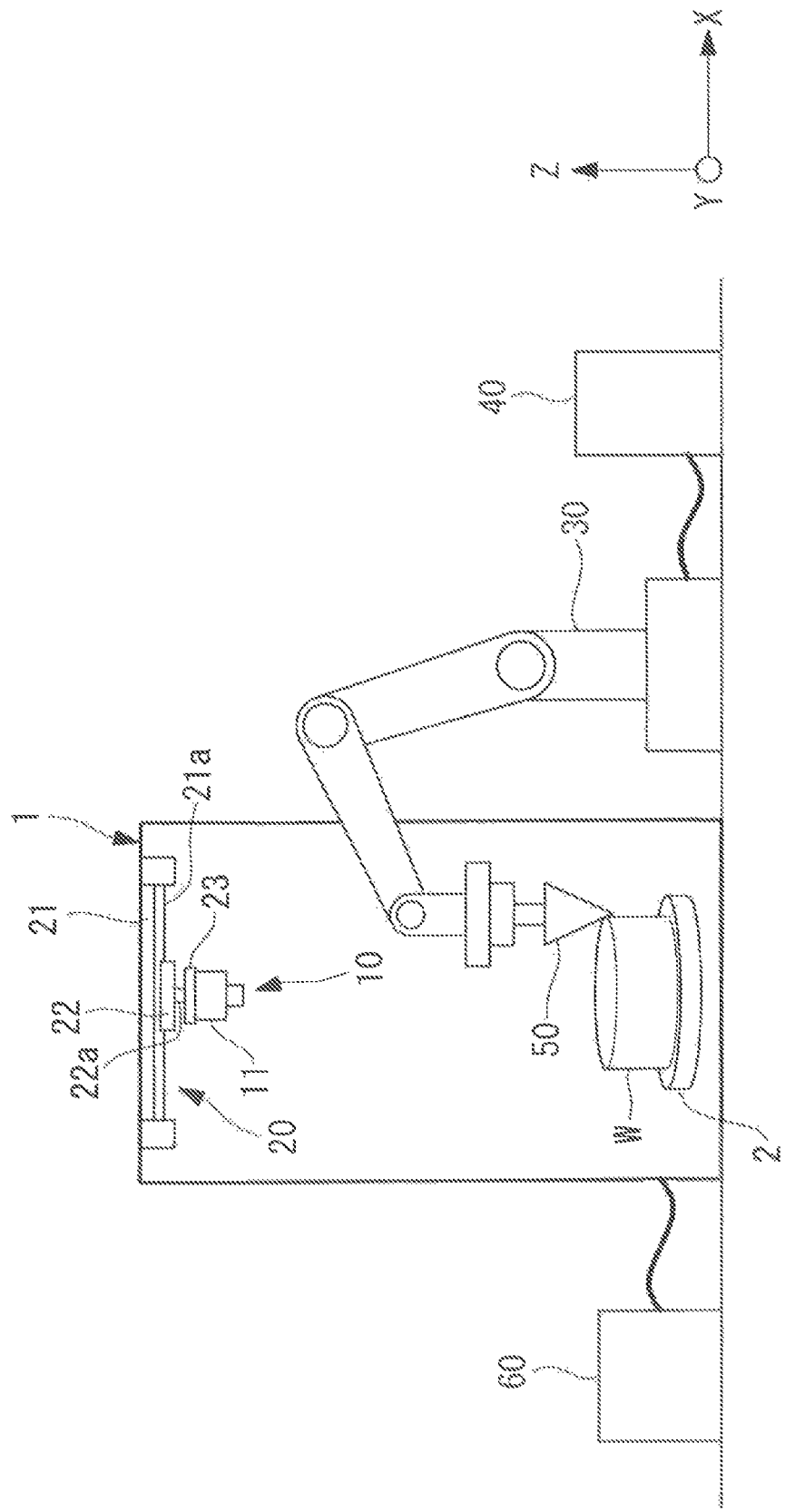
FIG. 1 is a schematic front view of a deburring apparatus according to a first embodiment of the present invention.

As shown in FIG. 1, the deburring apparatus includes a visual sensor 10 provided in a machine tool 1, a moving device 20 as a relative movement means for moving the visual sensor 10 relative to a workpiece W that is an object supported by a support 2 in the machine tool 1, a robot 30 that supports a deburring tool 50 and uses the deburring tool 50 to deburr the workpiece W supported by the support 2, and a robot control unit 40 that controls the robot 30.

The machine tool 1 is a known machine tool that uses a cutting tool (such as a milling cutter, a drill, a cutting tool) to cut such as flatten the workpiece W supported by the support 2. As the support 2, a chuck that fixes the workpiece W using a plurality of claws, a chuck that fixes the workpiece W using a magnetic force or air suction, or other support mechanisms that support the workpiece W for cutting can be used.

Figure 2:
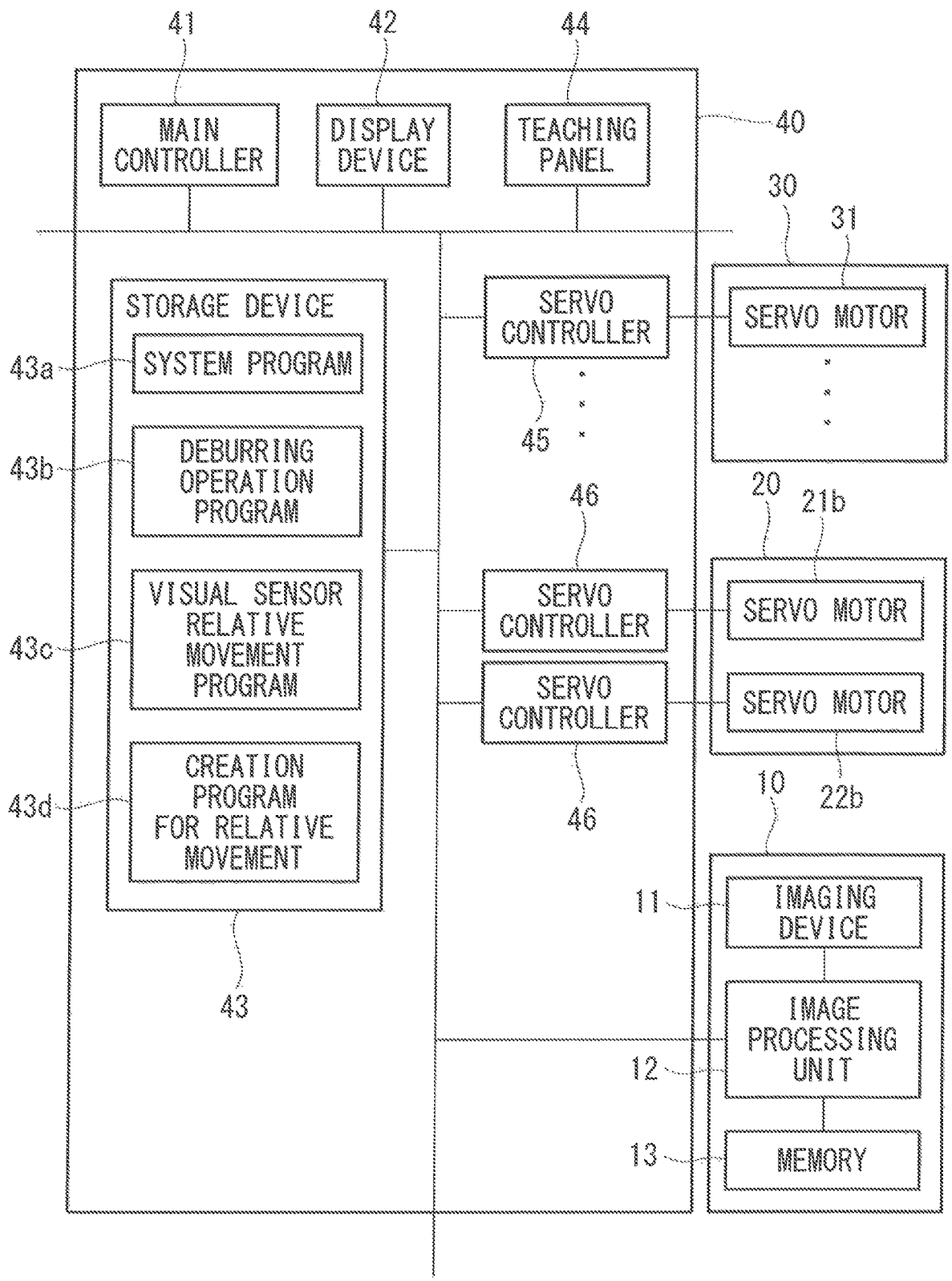
FIG. 2 is a block diagram of a robot control unit used in the deburring apparatus according to the first embodiment.

The visual sensor 10 includes an imaging device 11 that acquires images of the workpiece W on the support 2, an image processing unit 12 that performs a predetermined image processing for images taken by the imaging device 11, and sends information based on the processed images to the robot control unit 40, and a memory 13 (see FIG. 2).

The image processing unit 12 includes a computer having CPU, RAM, and the like, performs a well-known image processing such as static binarization or dynamic binarization for the taken images, stores the processed images in the memory 13, and sends the information based on the processed images to the robot control unit 40.

The image processing unit 12 may send the processed image as the information based on the processed images to the robot control unit 40, or send positional information of characteristic points of each workpiece W appearing on the processed images (for example, positional data of the points that constitute a ridge of an outer peripheral edge of the workpiece W) as the information based on the processed images to the robot control unit 40. Hereinafter, the positional data of the points that constitute the ridge of the outer peripheral edge of the workpiece W is sometimes referred to as "positional data of the ridge of the processed image".

As shown in FIG. 1, the moving device 20 includes a first base 21 fixed to an upper wall or the like of the machine tool 1, a rail 21*a* provided on the first base 21 to extend in an X-axis direction as a horizontal direction, a second base 22 that is supported by the rail 21*a* and movable along the rail 21*a*, a rail 22*a* provided on the second base 22 to extend in a Y-axis direction as a horizontal direction, and a third base 23 that is supported by the rail 22*a* and movable along the rail 22*a*. Here, the X axis is perpendicular to the Y axis, and a Z axis is perpendicular to the X axis and the Y axis.

The first base 21 has, for example, a servo motor 21*b* as a drive unit that moves the second base 22 along the rail 21*a*, and the second base 22 has, for example, a servo motor 22*b* as a drive unit that moves the third base 23 along the rail 22*a*. The servo motors 21*b*, 22*b* are connected to the robot control unit 40 (see FIG. 2). The servo motors 21*b*, 22*b* each include an operation position detection device such as an encoder that detects an operation position of the servo motor, and a detection value from the operation position detection device is sent to the robot control unit 40.

The robot 30 includes a plurality of movable portions and a plurality of servo motors 31 that drive the plurality of movable portions, respectively (see FIG. 2). As the servo motors 31, various types of servo motors may be used such as a rotary motor or a linear motor. The servo motors 31 each include an operation position detection device such as an encoder that detects an operation position of the servo motor, and detection values from the operation position detection devices are sent to the robot control unit 40.

A deburring tool 50 is supported at a distal end of the robot 30. The deburring tool 50 is a grinder that rotates a grindstone in this embodiment, but may be a tool used for deburring, and a cutter that rotates a cutting tool may be used.

The robot control unit 40 includes, for example, a main controller 41 having CPU, RAM, and the like, a display device 42, a storage device 43 having a nonvolatile memory, ROM, or the like, a teaching panel 44 operated when creating an operation program of the robot 30, a plurality of servo controllers 45 provided correspondingly to the servo motors 31 in the robot 30, respectively, and a plurality of servo controllers 46 provided correspondingly to the servo motors 21*b*, 22*b* in the moving device 20 (see FIG. 2). In this embodiment, the moving device 20 is controlled as an additional axis.

The storage device 43 stores a system program 43*a*, and the system program 43*a* provides a basic function of the robot control unit 40. The storage device 43 also stores at least one deburring operation program 43*b* created using the teaching panel 44, and at least one visual sensor relative movement program 43*c* created using the teaching panel 44. The storage device 43 further stores a creation program for relative movement 43*d*.

For example, the main controller 41 is operated by the system program 43*a*, reads the deburring operation program 43*b* stored in the storage device 43 and temporarily stores the deburring operation program 43*b* in the RAM, sends control signals to the servo controllers 45 according to the read deburring operation program 43*b*, thereby controlling servo amplifiers of the servo motors 31.

The main controller 41 reads the visual sensor relative movement program 43*c* stored in the storage device 43 and temporarily stores the visual sensor relative movement program 43*c* in the RAM, sends control signals to the servo controllers 46 according to the read visual sensor relative movement program 43*c*, thereby controlling servo amplifiers of the servo motors 21*b*, 22*b*.

Figure 3:
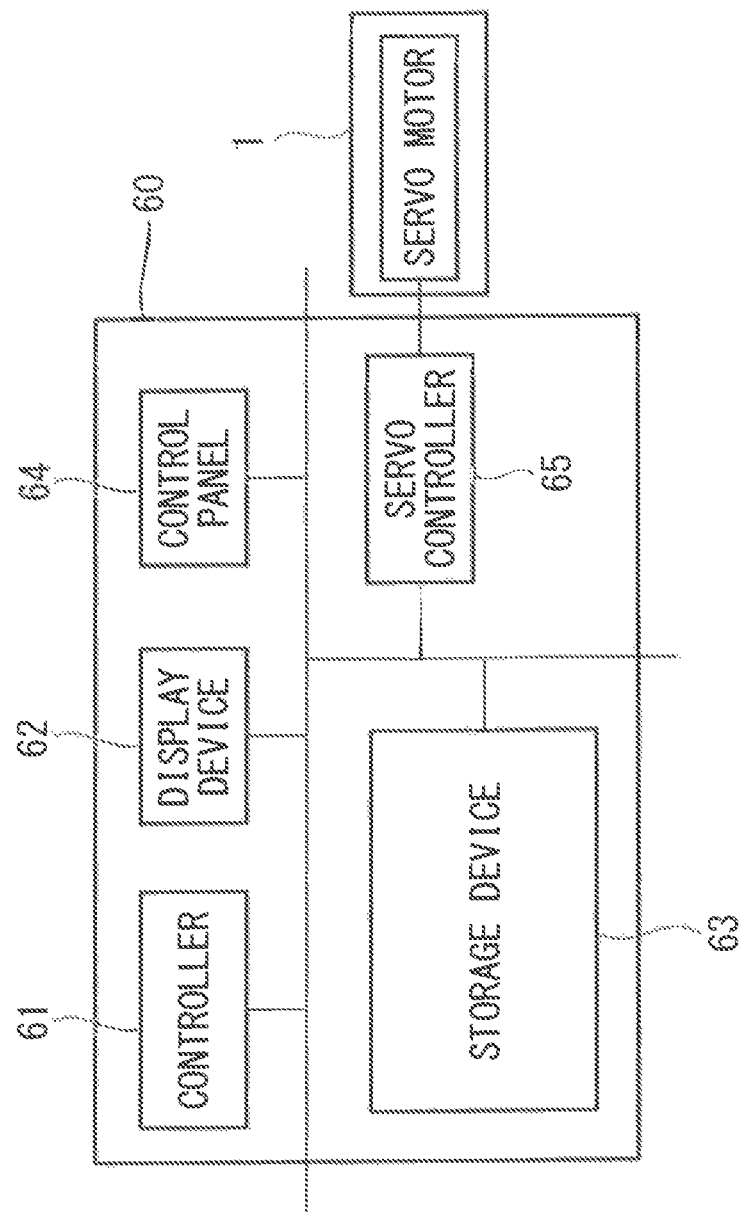
FIG. 3 is a block diagram of a machine tool control unit in the first embodiment.

The machine tool 1 includes a machine tool control unit 60. For example, the machine tool control unit 60 includes a controller 61 having CPU, RAM, and the like, a display device 62, a storage device 63 having a nonvolatile memory, ROM, or the like, a control panel 64 operated when creating an operation program of the machine tool 1, and a servo controller 65 provided correspondingly to a servo motor in the machine tool 1 (see FIG. 3). The machine tool control unit 60 is connected to the robot control unit 40.

Figure 4:
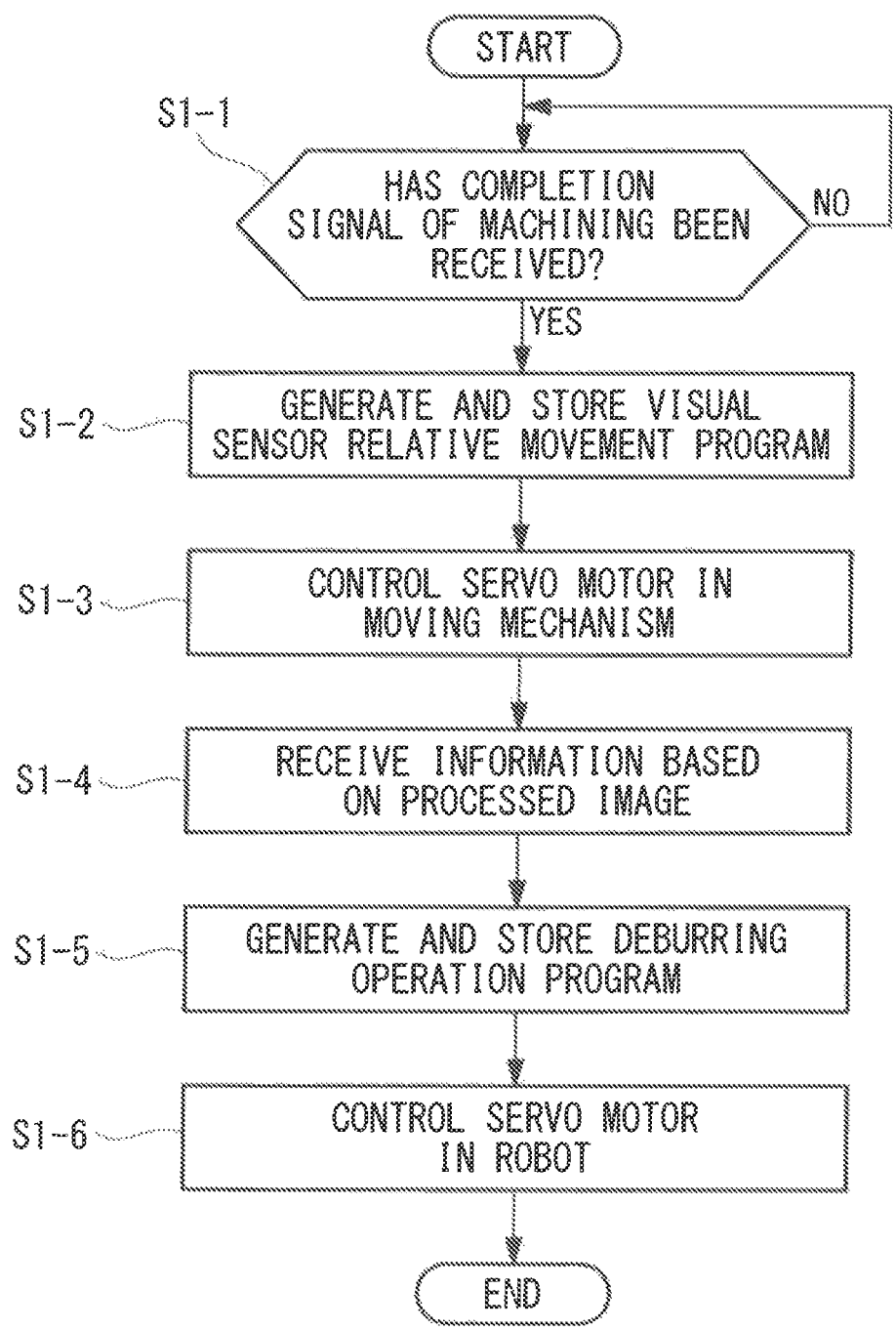
FIG. 4 is a flowchart of processing of a main controller in the robot control unit used in the deburring apparatus according to the first embodiment.

With reference to FIG. 4, an example operation of the main controller 41 of the robot control unit 40 of the deburring apparatus thus configured will be described below.

First, the main controller 41 receives, for example, a completion signal of machining which indicates that cutting of the workpiece W is finished from the machine tool control unit 60 (step S1-1). Then, the main controller 41 operates based on the creation program for relative movement 43*d* to generate the visual sensor relative movement program 43*c* and store the visual sensor relative movement program 43*c* in the storage device 43 (step S1-2). At this time, the main controller 41 serves as a visual sensor program generation means.

For example, the main controller 41 receives three-dimensional data indicating a shape and a position of the workpiece W supported by the support 2 and having been cut from the machine tool control unit 60. The three-dimensional data may contain data indicating a shape and a position of an outer peripheral edge (a portion to be deburred) of a flattened plane of the workpiece W. Instead of the three-dimensional data, two-dimensional data indicating the shape and the position of the outer peripheral edge (portion to be deburred) of the flattened plane of the workpiece W may be used. In this embodiment, the three-dimensional data and the two-dimensional data are extracted from CAD data, and stored for cutting by the machine tool 1, but other data indicating the shape and the position of the workpiece W may be used.

Figure 5:
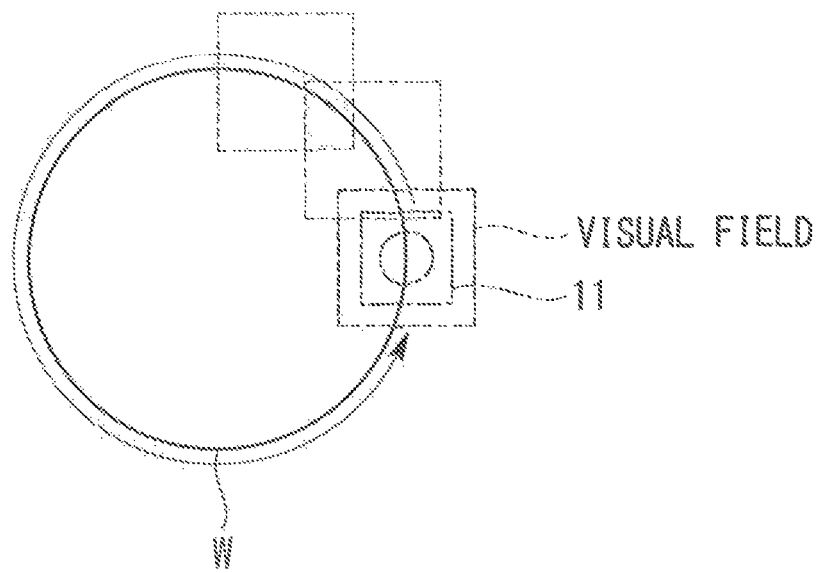
FIG. 5 illustrates an operation of the deburring apparatus according to the first embodiment.

The main controller 41 uses the three-dimensional data received from the machine tool control unit 60 and the information regarding the visual field of the imaging device 11 to generate the visual sensor relative movement program 43*c* for moving the imaging device 11 along a locus corresponding to the portion to be deburred so that the portion to be deburred is within the visual field of the imaging device 11, for example, as shown in FIG. 5. If the visual field of the imaging device 11 is large to some extent, the visual sensor relative movement program 43*c* may be generated without using the information regarding the visual field of the imaging device 11.

Then, the main controller 41 sends control signals to the servo controllers 46 according to the generated visual sensor relative movement program 43*c*, thereby controlling the servo amplifiers of the servo motors 21*b*, 22*b* in the moving device 20 (step S1-3). This control moves the imaging device 11 along the locus corresponding to the portion to be deburred.

Then, the main controller 41 receives, for example, the positional data of the points that constitute the ridge of the outer peripheral edge of the workpiece W (positional data of the ridge of the processed image) as the information based on the processed image sent from the image processing unit 12 (step S1-4). Then, the main controller 41 serves as a deburring operation program generation means, uses the received information based on the processed image to generate the deburring operation program 43b, and stores the deburring operation program 43b in the storage device 43 (step S1-5).

For example, in the case where an outer peripheral edge of an upper surface of the machined workpiece W supported by the support 2 is the portion to be deburred, and the main controller 41 has obtained information regarding a height position of the upper surface from the machine tool control unit 60, a series of control signals (robot operation commands) are generated for moving the grindstone of the deburring tool 50 along a locus 1 mm shifted inside the workpiece W relative to the positional data of the ridge of the processed image, and the series of control signals are stored as the deburring operation program 43b.

Then, the main controller 41 sends control signals to the servo controllers 45 according to the generated deburring operation program 43b, thereby controlling the servo amplifiers of the servo motor 31 in the robot 30 (step S1-6).

In this embodiment, the workpiece W supported by the support 2 in the machine tool 1 is cut, and then the robot 30 uses the deburring tool 50 to deburr the workpiece W supported by the support 2. As such, the workpiece W is not moved from the support 2 in the machine tool 1 for deburring, thereby reducing time for deburring.

Also, since the workpiece W is deburred while being supported by the support 2 in the machine tool, the position and shape information of the workpiece W stored in the machine tool 1 can be used in step S1-2 to efficiently generate the visual sensor relative movement program 43c for detecting the ridge of the workpiece W.

In this embodiment, the control signals may be sent, in step S1-3, to the servo controllers 46 according to the visual sensor relative movement program 43c previously stored in the storage device 43, without performing step S1-2. If the positions and the shapes of the portions to be deburred in the workpiece W do not relatively widely vary with respect to the visual field of the imaging device 11, for example, CAD data may be used to previously generate the visual sensor relative movement program 43c and store the visual sensor relative movement program 43c in the storage device 43.

Figure 6:
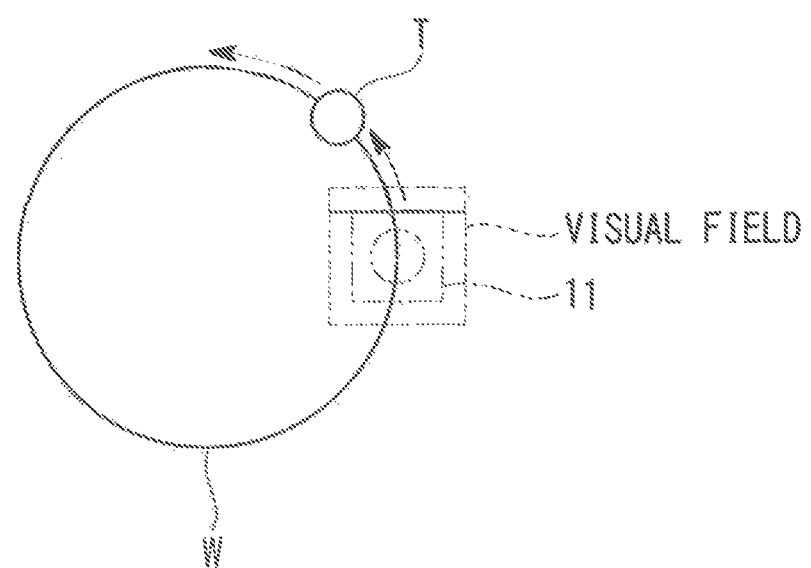
FIG. 6 illustrates an operation of a deburring apparatus according to a first modification of the first embodiment.

In this embodiment, when the main controller 41 receives a signal indicating that cutting of the workpiece W reaches a predetermined stage from the machine tool control unit 60 as step S1-1, for example, a machining start signal indicating that a machining tool T has started machining of the outer peripheral edge of the workpiece W for the last round, the main controller 41 may generate the visual sensor relative movement program 43c in step S1-2 to start movement along the locus corresponding to the portions to be deburred from the imaging device 11 during machining using the machining tool T as shown in FIG. 6.

In this embodiment, it is allowed that the main controller 41 does not generate the visual sensor relative movement program 43c in step S1-2, but the controller 61 in the machine tool control unit 60 generates the visual sensor relative movement program 43c, and the main controller 41 receives the visual sensor relative movement program 43c generated by the controller 61 in step S1-2.

Further, it is allowed that the main controller 41 does not generate the deburring operation program 43b in step S1-5, but the controller 61 in the machine tool control unit 60 receives the positional data of the ridge of the processed image from the image processing unit 12, uses the received positional data of the ridge of the processed image to generate the deburring operation program 43b, and the main controller 41 receives the deburring operation program 43b generated by the controller 61 in step S1-5.

In this embodiment, a moving device control unit for controlling the moving device 20 may be provided, and the moving device control unit may control the moving device 20 instead of the control process that the robot control unit 40 controls the moving device 20 in step S1-3. Alternatively, the controller 61 in the machine tool control unit 60 may control the moving device 20.

In this embodiment, instead of using the three-dimensional data or the two-dimensional data stored in the machine tool 1 in step S1-2, information regarding a machining locus such as teaching points used when the machine tool 1 cuts the workpiece W, or information regarding an actual machining locus obtained based on detection values from the operation position detection device of servo motors in the machine tool 1 while the machine tool 1 is cutting the workpiece W may be used to generate the visual sensor relative movement program 43c. Further, the three-dimensional data or the two-dimensional data and the information regarding the machining locus may be used to generate the visual sensor relative movement program 43c.

In this embodiment, instead of using the three-dimensional data or the two-dimensional data stored in the machine tool 1 in step S1-2, the main controller 41 may obtain data indicating an actual shape of the cut workpiece W from the visual sensor 10 or the like, and use the data and the information regarding the visual field of the visual sensor 10 to generate the visual sensor relative movement program 43c. In this case, the information regarding the actual shape of the cut workpiece W is obtained, thereby improving precision of the visual sensor relative movement program 43c for detecting the ridge even for workpieces W having various shapes and sizes.

In this embodiment, the visual sensor relative movement program 43c for the moving device 20 to cause relative movement between the workpiece W supported by the support 2 and the imaging device 11 is generated in step S1-2, and the moving device 20 moves the imaging device 11 in step S1-3.

Figure 7:
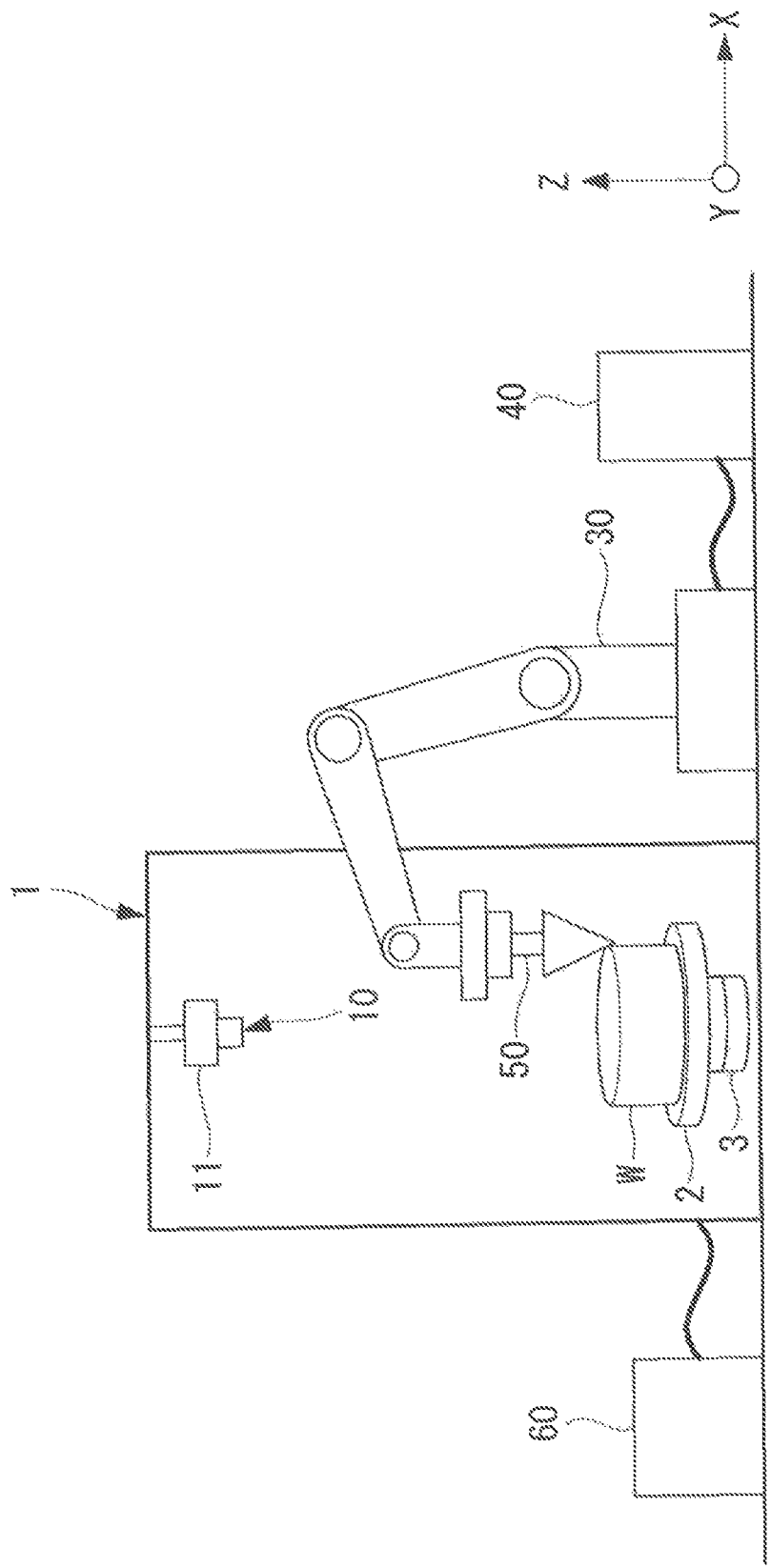
FIG. 7 is a schematic front view of a deburring apparatus according to a second modification of the first embodiment.

On the other hand, as shown in FIG. 7, the imaging device 11 may be fixed to the upper wall or the like of the machine tool 1 without the moving device 20, and a moving device 3 that moves the support 2 may be provided.

Figure 8:
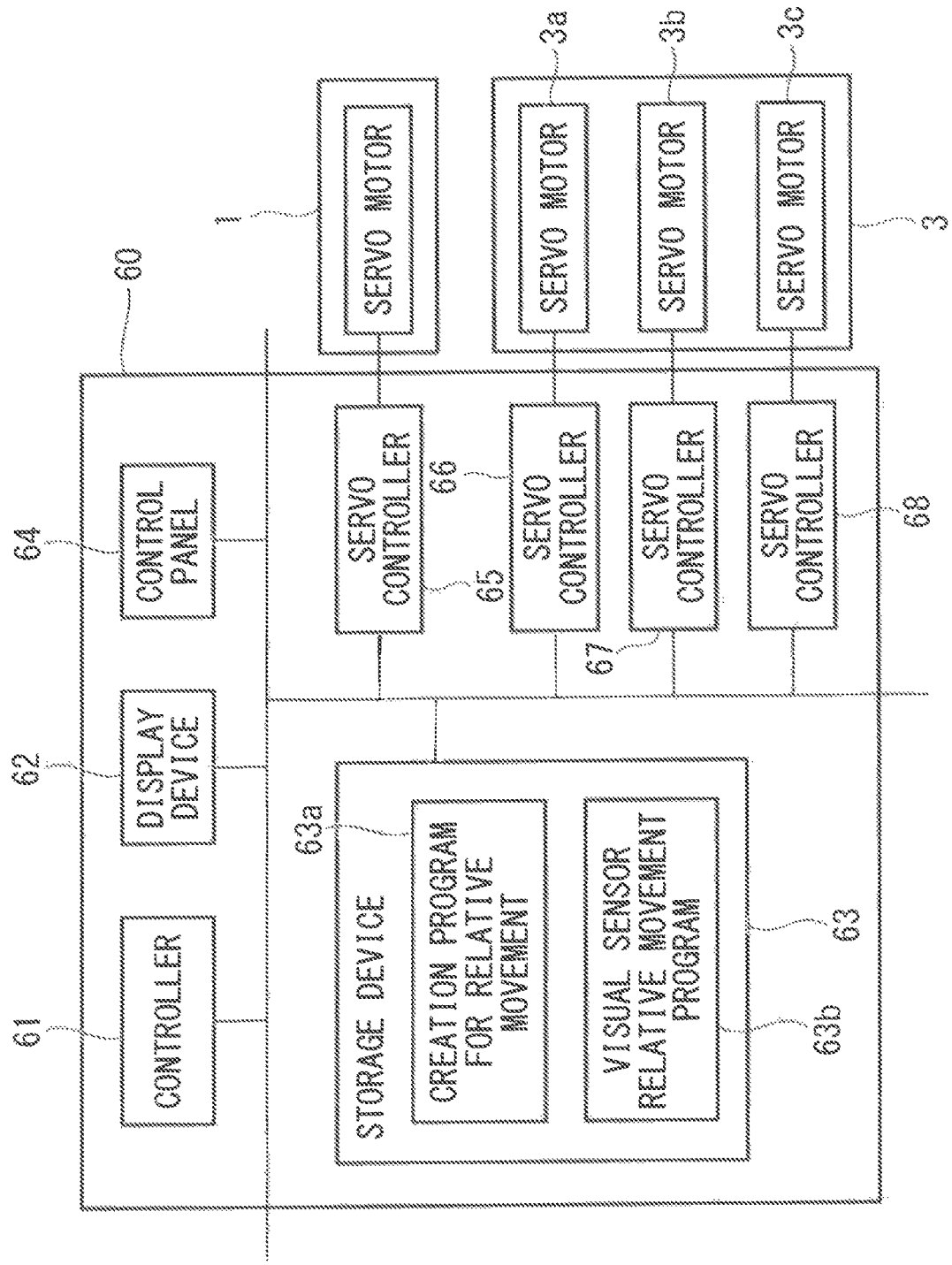
FIG. 8 is a block diagram of a machine tool control unit used in the deburring apparatus according to the second modification of the first embodiment.

In this case, the moving device 3 includes a servo motor 3a and a moving mechanism (not shown) as a drive unit that moves the support 2 in the X-axis direction, a servo motor 3b and a moving mechanism (not shown) as a drive unit that moves the support 2 in the Y-axis direction, and a servo motor 3c and a rotary mechanism (not shown) as a drive unit that rotates the support 2 around the Z axis (see FIG. 8). The servo motors 3a, 3b, 3c each include an operation position detection device such as an encoder that detects an operation position of the servo motor, and a detection value from the operation position detection device is sent to the machine tool control unit 60. The servo motors 3a, 3b, 3c in the moving device 3 are controlled via servo controllers 66, 67, 68, respectively, by the controller 61 in the machine tool control unit 60.

Figure 9:
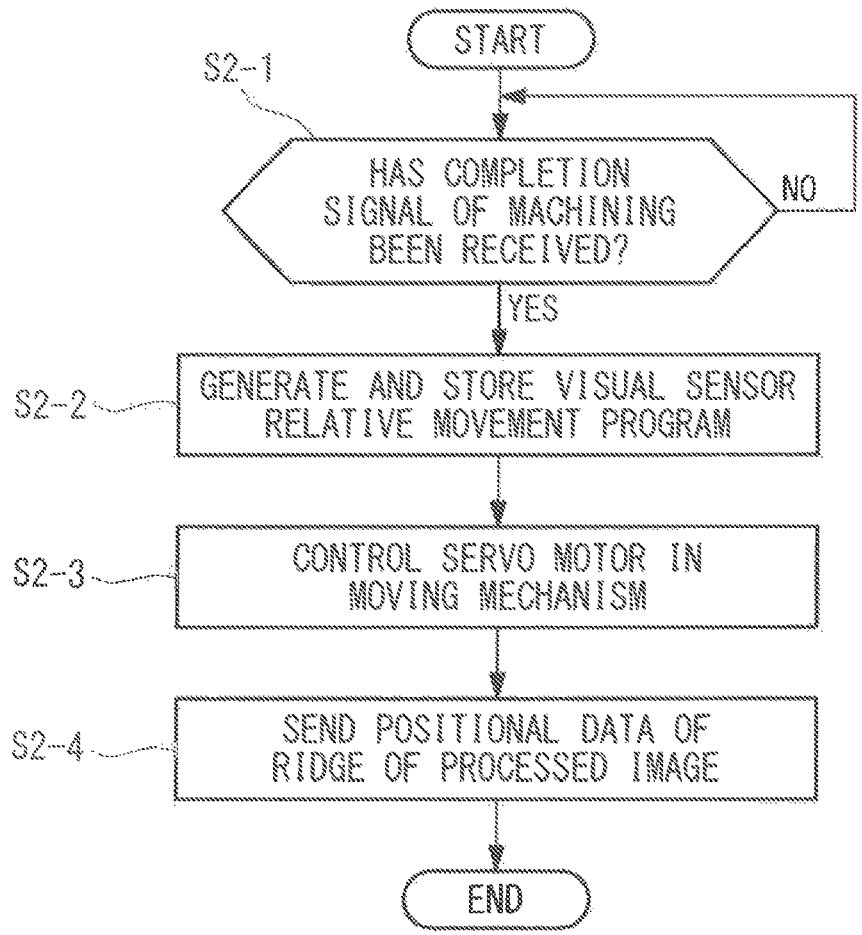
FIG. 9 is a flowchart of processing of a main controller in the machine tool control unit used in the deburring apparatus according to the second modification of the first embodiment.

With reference to FIG. 9, an example of an operation of the controller 61 in the machine tool control unit 60 of the deburring apparatus in this case will be described below.

First, the controller 61 receives, for example, a completion signal of machining which indicates that cutting of the workpiece W is finished in the machine tool 1 (step S2-1). Then, the controller 61 operates based on a creation program for relative movement 63a stored in the storage device 63 to generate a visual sensor relative movement program 63b and store the visual sensor relative movement program 63b in the storage device 63 (step S2-2).

Figure 10:
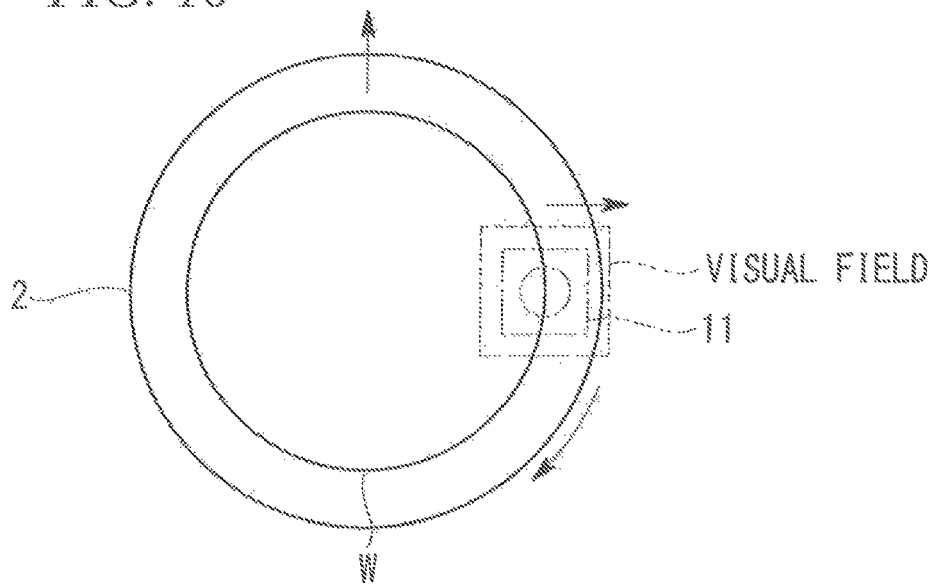
FIG. 10 illustrates an operation of the deburring apparatus according to the second modification of the first embodiment.

For example, the controller 61 generates the visual sensor relative movement program 63b for moving the support 2 in the X-axis direction and the Y-axis direction using the servo motors 3a, 3b so that the outer peripheral edge (portion to be deburred) of the workpiece W is within the visual field of the imaging device 11, for example, as shown in FIG. 10, and for rotating the support 2 around the Z axis using the servo motor 3c, based on the three-dimensional data indicating the shape and the position of the workpiece W supported by the support 2 and having been cut.

Then, the controller 61 sends control signals to the servo controllers 66, 67, 68 according to the generated visual sensor relative movement program 63b, thereby controlling the servo amplifiers of the servo motors 3a, 3b, 3c in the moving device 3 (step S2-3). This control moves the imaging device 11 along the locus corresponding to the portion to be deburred.

Then, the controller 61 receives the positional data of the points that constitute the ridge of the outer peripheral edge of the workpiece W (positional data of the ridge of the processed image) as the information based on the processed image sent from the image processing unit 12. Then, the controller 61 associates the received positional data of the ridge of the processed image with the detection values from the operation position detection devices in the servo motors 3a, 3b, 3c, and sends the data to the main controller 41 in the robot control unit 40 (step S2-4).

In this case, the main controller 41 can use the data in step S2-4 sent from the controller 61 to perform steps S1-4 to S1-6.

In step S1-5, the deburring operation program 43b may be generated to contain a series of control signals (robot operation commands) for the servo controller 45 that causes the robot 30 to move the deburring tool 50 to a predetermined position and stop the deburring tool 50 at that position, and a series of control signals (machine tool operation commands) for the servo controllers 66, 67, 68 for moving the grindstone of the deburring tool 50 along the locus based on the positional data of the ridge of the processed image. In this case, the machine tool operation commands are sent to the machine tool control unit 60 in step S1-6.

A deburring apparatus according to a second embodiment of the present invention will be described with reference to the drawings.

Figure 11:
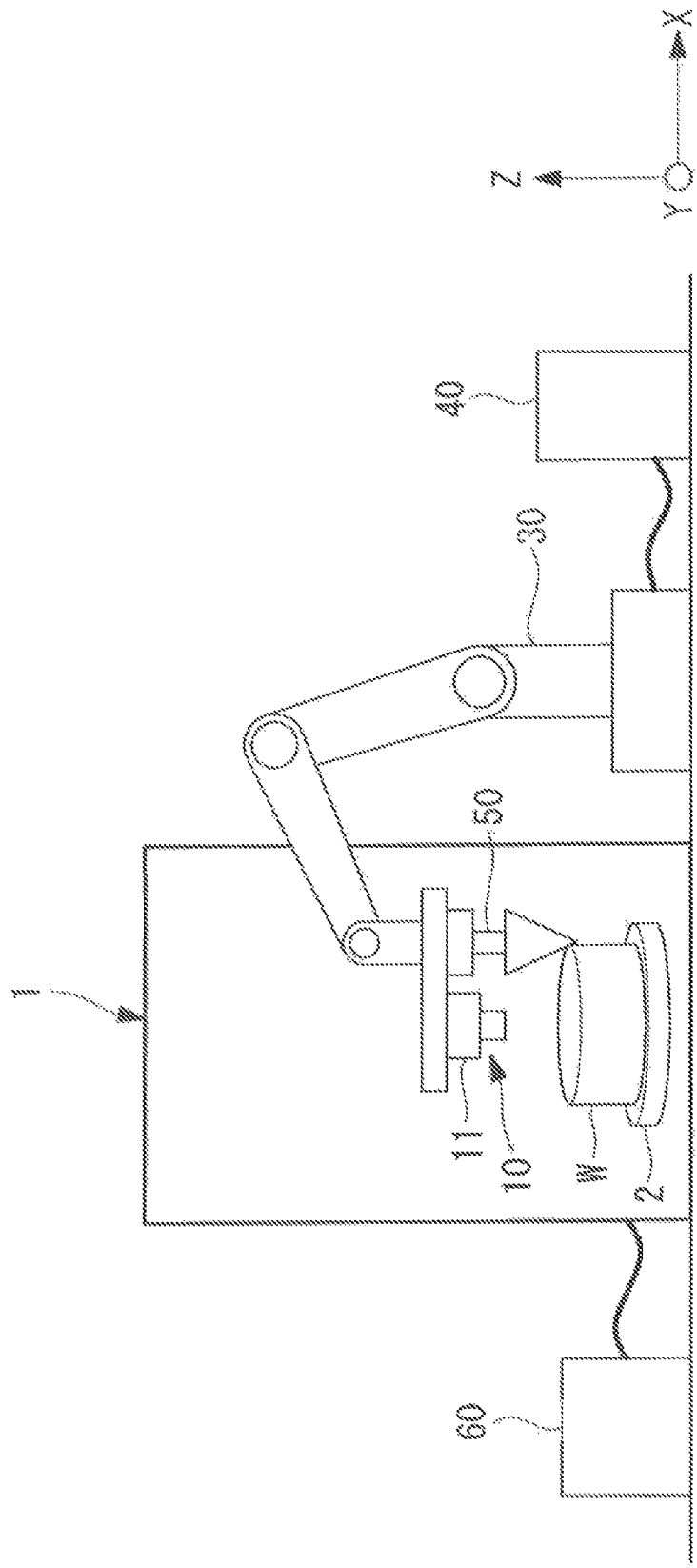
FIG. 11 is a schematic front view of a deburring apparatus according to a second embodiment of the present invention.
Figure 12:
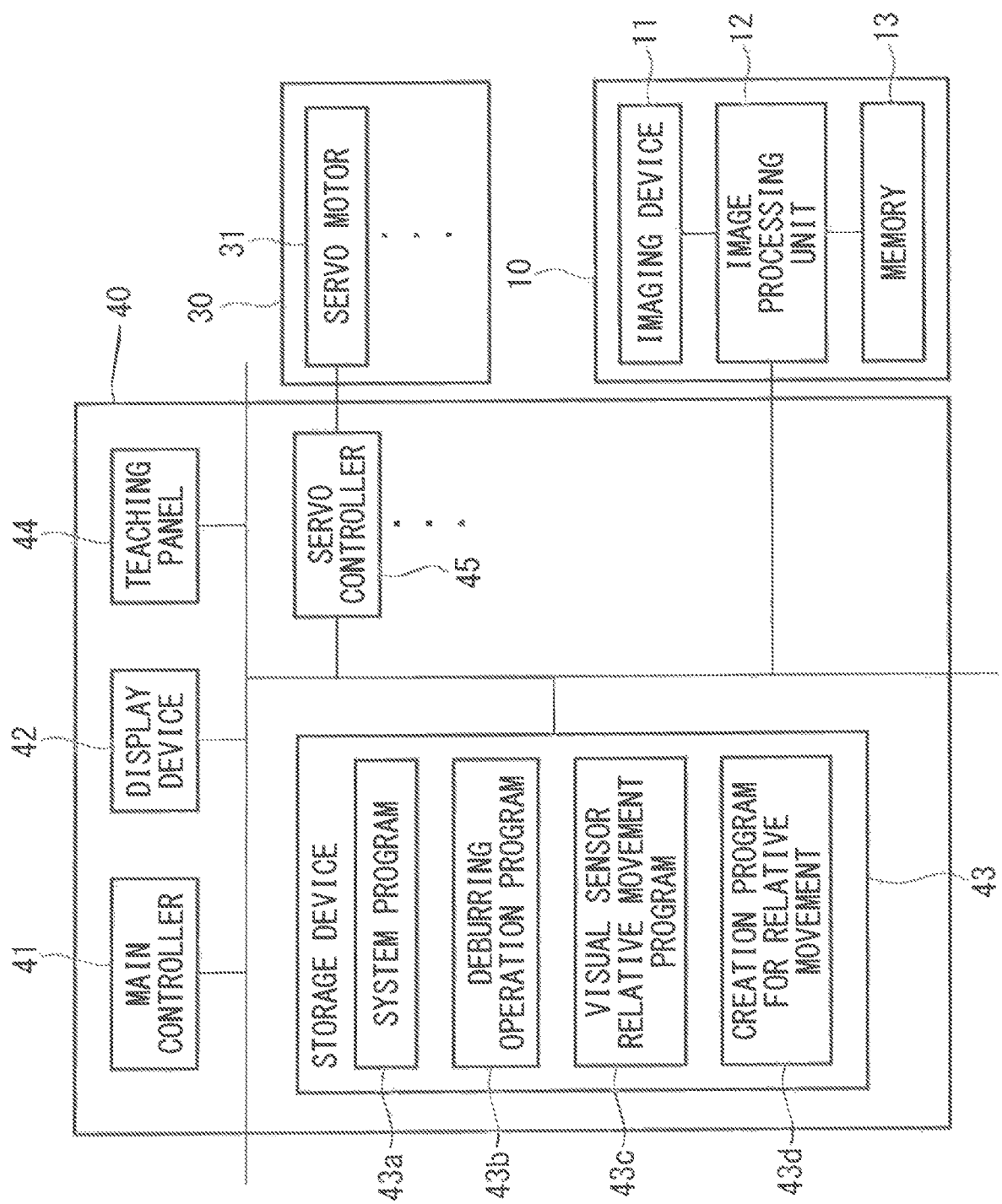
FIG. 12 is a block diagram of a robot control unit used in the deburring apparatus according to the second embodiment.

As shown in FIGS. 11 and 12, the deburring apparatus according to the second embodiment is such that the robot 30 supports the imaging device 11 without providing the moving device 20 in the first embodiment. Specifically, the robot 30 serves as a relative movement means for performing relative movement between the visual sensor 10 and the workpiece W supported by the support 2. The same configurations as in the first embodiment are denoted by the same reference numerals, and descriptions thereof will be omitted.

With reference to FIG. 13, an example of an operation of the main controller 41 in the robot control unit 40 of the deburring apparatus thus configured will be described below.

The main controller 41 receives, for example, a completion signal of machining which indicates that cutting of the workpiece W is finished from the machine tool control unit 60 (step S3-1). Then, the main controller 41 operates based on the creation program for relative movement 43d to generate the visual sensor relative movement program 43c and stores the visual sensor relative movement program 43c in the storage device 43 (step S3-2).

For example, the main controller 41 uses the three-dimensional data received from the machine tool control unit 60 and the information regarding the visual field of the imaging device 11 to generate the visual sensor relative movement program 43c for moving the imaging device 11 along the locus corresponding to the portion to be deburred so that the portion to be deburred is within the visual field of the imaging device 11, for example, as shown in FIG. 5.

Then, the main controller 41 sends a control signal to servo controllers 45 according to the generated visual sensor relative movement program 43c, thereby controlling the servo amplifiers of the servo motors 31 in the robot 30 (step S3-3). This control moves the imaging device 11 along the locus corresponding to the portion to be deburred.

Then, the main controller 41 performs steps S3-4 to S3-6 which are respectively the same as or similar to steps S1-4 to S1-6 in the first embodiment.

Also in the second embodiment, the workpiece W supported by the support 2 in the machine tool 1 is cut, and then the robot 30 uses the deburring tool 50 to deburr the workpiece W supported by the support 2. As such, the workpiece W is not moved from the support 2 in the machine tool 1 for deburring, thereby reducing time for deburring.

Also, the ridge of the workpiece W is detected by the visual sensor 10 during the relative movement between the imaging device 11 of the visual sensor 10 and the workpiece W. Thus, even if, for example, the workpiece W is large and the ridge of the workpiece W cannot be detected with high precision when the entire workpiece W is placed within the visual field, detection precision of the ridge of the workpiece W can be matched to requested deburring precision.

Also, since the workpiece W is deburred while being supported by the support 2 in the machine tool 1, the position and shape information of the workpiece W stored in the machine tool 1 in step S3-2 can be used to efficiently generate the visual sensor relative movement program 43c for detecting the ridge of the workpiece W.

In the second embodiment, the control signal may be sent to the servo controllers 45 according to the visual sensor relative movement program 43c previously stored in the storage device 43 in step S3-3 without performing step S3-2. If the position and the shape of the portion to be deburred in the workpiece W do not relatively widely vary with respect to the visual field of the imaging device 11, for example, CAD data may be used to previously generate the visual sensor relative movement program 43c and store the visual sensor relative movement program 43c in the storage device 43.

In the second embodiment, when the main controller 41 receives a signal indicating that cutting of the workpiece W reaches a predetermined stage from the machine tool control unit 60, for example, when a machining start signal indicating that the machining tool T has started machining of the outer peripheral edge of the workpiece W for the last round is received as step S3-1, the controller 41 may generate the visual sensor relative movement program 43c in step S3-2 to start movement of the imaging device 11 along the locus corresponding to the portion to be deburred during machining using the machining tool T.

In the second embodiment, instead of using the three-dimensional data or the two-dimensional data stored in the machine tool 1 in step S3-2, information regarding a machining locus such as teaching points used when the machine tool 1 cuts the workpiece W, or information regarding an actual machining locus obtained based on detection values from the operation position detection devices of the servo motors in the machine tool 1 while the machine tool 1 is cutting the workpiece W may be used to generate the visual sensor relative movement program 43c. Further, the three-dimensional data or the two-dimensional data and the information regarding the machining locus may be used to generate the visual sensor relative movement program 43c.

In this embodiment, instead of using the three-dimensional data or the two-dimensional data stored in the machine tool 1 in step S3-2, the main controller 41 may serve as an actual shape information obtaining means to obtain data indicating an actual shape of the cut workpiece W from the visual sensor 10 or the like, and use the data and the information regarding the visual field of the visual sensor 10 to generate the visual sensor relative movement program 43c. In this case, the information regarding the actual shape of the cut workpiece W is obtained, thereby improving precision of the visual sensor relative movement program 43c for detecting the ridge even for workpieces W having various shapes and sizes.

In the second embodiment, the visual sensor relative movement program 43c for the robot 30 to cause relative movement between the workpiece W supported by the support 2 and the imaging device 11 is generated in step S3-2, and the robot 30 moves the imaging device 11 in step S3-3.

On the other hand, the moving device 3 shown in the modification of the first embodiment may move the support 2 while the robot 30 is immobilizing the imaging device 11 in a predetermined position.

It is allowed that a force sensor is provided in the deburring tool 50 or the robot 30, the force sensor detects force applied during deburring, and/or the visual sensor 10 performs detection during or after deburring, and the main controller 41 serves as machining propriety determination means to determine propriety of deburring based on the detection result.

Further, it is allowed that a force sensor is provided in the support 2 in the machine tool 1, the force sensor detects a force applied during deburring, and/or the visual sensor 10 performs detection during or after deburring, and the main controller 41 serves as a machining propriety determination means to determine propriety of deburring based on the detection result.

The inventors have arrived at the following aspects of the present invention.

An aspect of the present invention provides a deburring apparatus including: a robot that supports a deburring tool, and uses the deburring tool to conduct a deburring process for an object supported by a support in a machine tool and having been cut;

a visual sensor;

a relative movement mechanism for causing relative movement between the visual sensor and the object supported by the support; and a controller, wherein the controller is configured to conduct: an operation process that operates the relative movement mechanism based on a visual sensor relative movement program for controlling operation of the relative movement mechanism so that a ridge of the object supported by the support is detected by the visual sensor during the relative movement; and a deburring operation program generation process which generates a deburring operation program by using the detected ridge obtained by the visual sensor when the relative movement mechanism is operated based on the visual sensor relative movement program, wherein the deburring operation program is a program which operates the robot and/or the machine tool so that the deburring tool moves along a locus based on the detected ridge.

In this aspect, the object supported by the support in the machine tool is cut, and then the robot uses the deburring tool to deburr the object supported by the support. As such, the object is not moved from the support in the machine tool for deburring, thereby reducing time for deburring.

Also, the ridge of the object is detected by the visual sensor during the relative movement between the visual sensor and the object. Thus, even if, for example, the object is large and the ridge of the object cannot be detected with high precision when the entire object is placed within the visual field, detection precision of the ridge of the object can match requested deburring precision.

In the above aspect, the burring apparatus may include a visual sensor program generation means which generates the visual sensor relative movement program by using at least one of position and shape information containing at least information regarding a position and a shape of a portion to be deburred in the cut object and information regarding a machining locus along which a machining tool is moved during cutting in order to cause the relative movement after the cutting so that the ridge is detected by the visual sensor.

Since the object is deburred while being supported by the support in the machine tool, for example, the position and shape information of the object stored in the machine tool and the information regarding the machining locus along which the machining tool is moved during the cutting can be used to efficiently generate the visual sensor relative movement program for detecting the ridge.

In the above aspect, the deburring apparatus may include an actual shape information obtaining means for obtaining information regarding an actual shape of the cut object; and a visual sensor program generation means which generates the visual sensor relative movement program by using the information regarding the actual shape obtained by the actual shape information obtaining means and information regarding a visual field of the visual sensor in order to cause the relative movement after the cutting so that the ridge is detected by the visual sensor.

The actual shape information obtaining means can obtain the information regarding the actual shape of the cut object, thereby improving precision of the visual sensor relative movement program for detecting the ridge even for objects having various shapes and sizes.

In the above aspect, the visual sensor relative movement program may be for operating the relative movement means so that the visual sensor is moved relative to the object whose position and orientation are not changed or so that the object is moved relative to the visual sensor whose position and orientation are not changed.

In the above aspect, the deburring operation program may contain robot operation commands for operating the robot supporting the deburring tool relative to the object whose position and orientation are not changed.

Further, the deburring operation program may contain machine tool operation commands for operating the machine tool to change the position and the orientation of the object.

In the above aspect, the deburring apparatus may include a machining propriety determination means which determines propriety of deburring process during or after the deburring process by using a detection result from at least one of a force sensor provided in the machine tool and the visual sensor.

Alternatively, the deburring apparatus may include a machining propriety determination means which determines propriety of deburring process during or after the deburring process by using a detection result from at least one of a force sensor provided in the robot and the visual sensor.

Such configurations are advantageous for maintaining or improving deburring precision.

The aforementioned aspects can improve deburring precision while reducing time for deburring.

REFERENCE SIGNS LIST 1 machine tool
2 support
10 visual sensor
11 imaging device
20 moving device
30 robot
40 robot control unit
50 deburring tool
60 machine tool control unit
W workpiece

The invention claimed is:

1. A deburring apparatus comprising:
   a robot that supports a deburring tool, and uses the deburring tool to conduct a deburring process for an object supported by a support in a machine tool and having been cut;
   a visual sensor;
   a relative movement mechanism for causing relative movement between the visual sensor and the object supported by the support; and
   a controller, wherein the controller is configured to conduct:
      an operation process that operates the relative movement mechanism based on a visual sensor relative movement program for controlling operation of the relative movement mechanism so that the relative movement mechanism moves the visual sensor relative to the object along a locus corresponding to a deburring target portion along an outer edge of the object in a state in which at least a portion of the outer edge of the object is located within a visual field of the visual sensor, wherein the controller is configured to operate the relative movement mechanism so that a ridge of the object supported by the support is detected by the visual sensor during the relative movement; and
      a deburring operation program generation process which generates a deburring operation program by using the detected ridge obtained by the visual sensor when the relative movement mechanism is operated based on the visual sensor relative movement program;
   wherein the deburring operation program is a program which operates the robot and/or the machine tool so that the deburring tool moves along a locus based on the detected ridge.

2. The deburring apparatus according to claim 1, wherein the controller is configured to conduct a visual sensor program generation process which generates the visual sensor relative movement program by using at least one of position and shape information containing at least information regarding a position and a shape of a portion to be deburred in the cut object and information regarding a machining locus along which a machining tool is moved during cutting in order to cause the relative movement after the cutting so that the ridge is detected by the visual sensor.

3. The deburring apparatus according to claim 1, wherein the controller is configured to conduct:
   an actual shape information obtaining process for obtaining information regarding an actual shape of the cut object; and
   a visual sensor program generation process which generates the visual sensor relative movement program by using the information regarding the actual shape obtained by the actual shape information obtaining process and information regarding a visual field of the visual sensor in order to cause the relative movement after the cutting so that the ridge is detected by the visual sensor.

4. The deburring apparatus according to claim 1, wherein the visual sensor relative movement program is for operating the relative movement mechanism so that the visual sensor is moved relative to the object whose position and orientation are not changed or so that the object is moved relative to the visual sensor whose position and orientation are not changed.

5. The deburring apparatus according to claim 1, wherein the deburring operation program contains robot operation commands for operating the robot supporting the deburring tool relative to the object whose position and orientation are not changed.

6. The deburring apparatus according to claim 1,
   wherein the deburring operation program contains machine tool operation commands for operating the machine tool to change the position and orientation of the object.

7. The deburring apparatus according to claim 1,
   wherein the controller is configured to conduct a machining propriety determination process which determines propriety of deburring process during or after the deburring process by using a detection result from at least one of a force sensor provided in the machine tool and the visual sensor.

8. The deburring apparatus according to claim 1, wherein the controller is configured to conduct a machining propriety determination process which determines propriety of deburring process during or after the deburring process by using a detection result from at least one of a force sensor provided in the robot and the visual sensor.

* * * * *